June 7, 1949.　　　A. J. MATTER　　　2,472,257

SHAFT SEAL WITH INTERNAL DRIVE

Filed Aug. 4, 1945

INVENTOR.
Albert J. Matter
BY
Charles P. Vrjtesh
atty.

Patented June 7, 1949

2,472,257

UNITED STATES PATENT OFFICE 2,472,257

SHAFT SEAL WITH INTERNAL DRIVE

Albert J. Matter, Park Ridge, Ill., assignor to Crane Packing Company, Chicago, Ill., a corporation of Illinois Application August 4, 1945, Serial No. 608,870

4 Claims. (Cl. 286—11)

This invention relates to seals for relatively rotatable structures such as a shaft and a housing therefor, and particularly to such seals which utilize sealing surfaces disposed in a radial plane.

The principal object of this invention is to provide a seal of the character described which will be very compact and inexpensive to make.

In seals which utilize sealing surfaces disposed in a radial plane it is necessary to provide a sealing washer having a sealing surface formed thereon, a flexible resilient sealing sleeve having one end in engagement with the washer and the other end in engagement with one of the relatively rotatable elements, a drive for the washer to relieve the sealing element of driving torque and a spring or other resilient device for maintaining the washer in sealing engagement with the cooperating surface of the other relatively rotatable elements.

A more specific object of this invention is to provide a drive for the washer of a seal of the type described which performs the additional function of effecting a seal with one of the relatively rotatable elements and also with one end of the resilient flexible sealing member.

A still more specific object of this invention is to provide a seal wherein a driving sleeve is provided for the washer of the seal, this sleeve having an enlarged end surrounding a shaft or similar device, with a resilient deformable ring of rubber or the like compressed between the enlarged end and the shaft, and a sealing member having a pair of spaced rings with a fold therebetween, one ring being compressed upon the exterior of the enlarged end of the driving sleeve and the other end being compressed against the back of the sealing washer.

Figure 1:
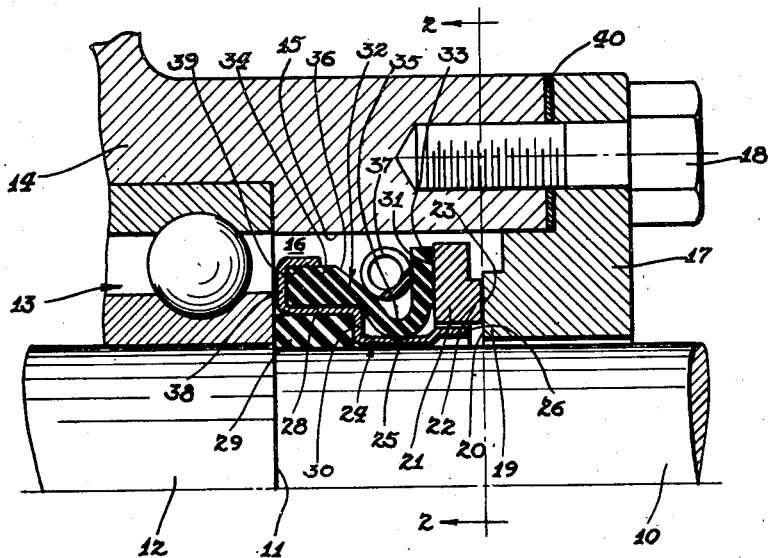
Figure 2:
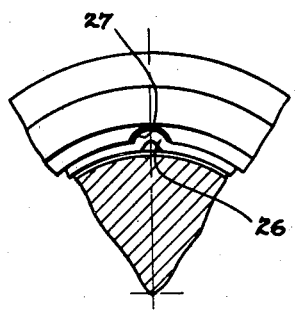

These and other objects and features of this invention will become apparent from the following detailed description when taken together with the accompanying drawings, in which Fig. 1 is a partial section of a seal incorporating the features of this invention taken along a plane passing through the axis of rotation of one of the sealing members; and Fig. 2 is a fragmentary section taken in a radial plane along the line 2—2 of Fig. 1.

Referring now to the drawings for a detailed description of the invention, there is shown for purposes of illustration, a shaft 10 having a shoulder 11 formed by an enlarged region 12 which is supported by means of a bearing 13 from a housing 14 or other device in which shaft 10 rotates. Said housing 14 has an opening 15 therein which with shaft 10 defines a chamber 16 which is in communication with bearing 13 and is adapted to receive lubricant from said bearing. The end of chamber 16 opposite bearing 13 is defined by a closure plate 17 which is secured by bolts 18 or otherwise to housing 14.

Closure plate 17 is formed with an axially inwardly extending flange 19 having a radially disposed surface 20 which constitutes one of the sealing surfaces of the sealing device. Said surface 20 is preferably ground and finished with a sufficiently smooth surface to adapt it for use in preventing the escape of fluid therealong. Adjacent flange 19 is a sealing washer 21 which is formed with an axially extending nose 22 having a radially disposed surface 23, likewise suitably ground and finished, so that when rotated relative to surface 20 and in contact therewith it will effect a seal between washer 21 and closure plate 17.

Washer 21 is driven from shaft 10 by means of a driving sleeve 24 which has an internal diameter at its smallest region 25 slightly larger than the diameter of shaft 10 to provide a clearance therebetween. At one end (Fig. 2) sleeve 24 is provided with one or more bosses 26 which fit into corresponding slots 27 formed on the inside of washer 21 whereby a sliding driving connection is formed therebetween. This connection permits washer 21 to move axially relative to sleeve 24, but prevents rotation of the washer relative to the sleeve under the influence of the friction developed between the cooperating sealing surfaces 20 and 23. At its opposite end (Fig. 1) sleeve 24 is enlarged as shown at 28 so as to form a space between enlarged end 28 and shaft 10. A resilient ring 29 preferably of synthetic rubber is compressed between enlarged end 28 and shaft 10 to provide a fluid-tight seal between sleeve 24 and shaft 10. Because of the tightness of the fit between end 28, ring 29 and shaft 10 a relatively rigid drive of sleeve 24 is likewise provided. Between enlarged end 28 and the remainder of sleeve 24 is a connecting shoulder 30 which is preferably located in a radial plane so that it can be utilized to push ring 29 on shaft 10 when the seal is to be installed upon the shaft.

The back surface 31 of washer 21 is preferably made perfectly flat so that a seal may be readily effected between the washer and the sealing means utilized to make a fluid-tight connection between the washer and sleeve 24. In the form chosen for illustration the sealing means is comprised of a sleeve 32 of resilient deformable material such as rubber or the like, either natural or synthetic or a combination of the two having a flange 33 at one end adjacent washer 21, a substantially cylindrical region 34 at the opposite end and a thin flexible inwardly extending fold 35 connecting the flange with the cylindrical region. A conical surface 36 is formed on the exterior of cylindrical portion 34 adjacent fold 35 and a garter spring 37 encircles the sleeve between the back of flange 33 and the said conical surface 36 so that an axial force is developed tending to separate the ends of the sealing sleeve.

Cylindrical region 34 of sleeve 32 is of substantial thickness and is initially of a smaller internal diameter than the external diameter of the enlarged end 28 of sleeve 24 so that when the cylindrical region is slid over the enlarged end 28 a considerable force is developed in the cylindrical region to provide a fluid-tight seal between the said cylindrical region and the enlarged end 28. In order properly to locate cylindrical region 34 on enlarged end 28, a flange 38 is formed on the end of the enlarged region 28, said flange, if desired, terminating in a reverse bend 39 which may be compressed upon cylindrical region 34 to preload the said cylindrical region upon the enlarged end 28.

It should be noted that in addition to the seal effected between enlarged end 28 and region 34, a further seal is established by the pressure of spring 37 on conical surface 36 which in turn is compressed against the corner in sleeve 24 formed at the juncture of shoulder 30 and enlarged end 28.

The seal is preferably assembled by first sliding cylindrical region 34 upon the outside of enlarged end 28 of sleeve 24 until flange 38 is encountered. The reverse bend 39 is then compressed upon the cylindrical region to insure a fluid-tight seal between the cylindrical region and the driving sleeve. With the sealing sleeve 32 secured to driving sleeve 24, ring 29 is then inserted into the enlarged end 28, the garter spring 37 is expanded over flange 33 and into the space between the flange and the cylindrical region and washer 21 is indexed over bosses 26. It is contemplated that spring 37 will be completely unloaded, i. e., it will exert no axial force at the point where the back region of slot 27 in washer 21 is in engagement with the front, i. e., the right-hand (Fig. 1) end of the boss 26 so that there will be no difficulty in properly positioning the washer with respect to the driving sleeve during the installation of the seal.

With the various elements assembled as above described, the seal is then threaded over the end of shaft 10 and pushed backward in the direction of bearing 13 until ring 29 abuts shoulder 11 or the bearing 13 itself, as the case may be. After the seal is in place on the shaft, closure plate 17 is secured to housing 14 by bolts 18 and in so doing washer 21 will be forced backward against the action of spring 37 until it assumes the position shown in Fig. 1. Any necessary adjustments between closure plate 17 and the seal itself may be made by a proper selection of gasket 40 as is the usual practice in the assembly of this type of seal.

In operation, ring 29, driving sleeve 24 and cylindrical region 34 of the sealing member 32 will be axially fixed relative to shaft 10 and will rotate with the shaft. The rotation of driving sleeve 24 will cause a similar rotation of washer 21 because of the driving connection 26, 27 therebetween. Any weaving or misalignment between the washer and closure plate 17 will be accommodated by the relatively loose fit between the washer and driving sleeve. Spring 37 will be effective at all times to exert an axial component of force between conical surface 32 and flange 33 of the sealing member 32 and this axial force will be transmitted through flange 33 to washer 21 so that the sealing surface 23 thereof will be constantly maintained in engagement with sealing surface 20 on flange 19. As the washer wears, the fold 35 will be extended so that a continuous seal is effected between washer 21 and driving sleeve 24 despite the movement of washer 21 along the shaft.

It should be noted that the smallest outside diameter of sealing sleeve 32 is greater than the smallest diameter of sealing surface 23 so that a small degree of balancing of fluid pressures on opposite sides of washer 21 is effected. Obviously this balancing may be increased by increasing the outer diameter of the fold 35 relative to the outer diameter of sealing surface 23.

It is obvious that the material from which the various elements just described are made will be so selected that they will not deteriorate under the conditions and in the environment in which they are intended to function. Thus ring 29 and sealing sleeve 32 can be made of neoprene or some other synthetic rubber which is impervious to oil and lubricants, and driving sleeve 24 may be made of steel if the environment is oily or it may be made of brass, stainless steel or other non-corrosive metal if the environment is such as to produce corrosion. It is understood further that the foregoing description is merely illustrative of a preferred embodiment of the invention and that the scope of this invention therefore is not to be limited thereto but is to be determined by the appended claims.

What is claimed is:

1. A sealing device for relatively rotatable elements comprising a sleeve concentric with and spaced from one of the elements, an enlarged part at the end of the sleeve, means compressed radially between the enlarged part and the said one element to form a fluid-tight seal therebetween and to provide a drive for the sleeve, a sealing surface on the other element, a sealing washer having a sealing surface in engagement with the first-mentioned sealing surface, flexible means having one end in fluid-tight engagement with the exterior surface of the enlarged part, the other end in fluid-tight engagement with the washer and a fold extending from the enlarged part radially toward the middle of the sleeve, and a slidable driving connection between the washer and sleeve.

2. A sealing device for relatively rotatable elements comprising a sleeve spaced from and surrounding one of the elements, an enlarged part at one end of the sleeve, a resilient band compressed radially between the enlarged part and the element surrounded by the sleeve to form a fluid-tight seal therebetween and to provide a drive for the sleeve, a sealing surface on the other element, a sealing washer surrounding the sleeve and having a sealing surface in contact with the first-mentioned sealing surface, flexible tubular means having a cylindrical part at one end in fluid-tight engagement with the exterior surface of the enlarged part, a flange at the other end in fluid-tight engagement with the washer and a fold extending from the enlarged part radially toward the middle of the sleeve, and a slidable driving connection between the washer and sleeve.

3. A seal for relatively rotatable structures, one of said structures having a radially disposed sealing surface, said seal comprising a washer having a sealing surface thereon adapted to cooperate with the first-mentioned surface to form a fluid-tight seal therebetween, a driving sleeve concentric with and spaced from the other of said structures, a slidable driving connection between the sleeve and washer, a sealing ring compressed radially between the sleeve and the other of said structures to form a fluid-tight seal therebetween and to drive the sleeve from the said other structure, a sealing element having a substantially cylindrical part at one end in contact with the sleeve, a flange at the other end in contact with the washer and a flexible radially inwardly extending fold connecting the flange and cylindrical part; said cylindrical part having a conical surface adjacent the fold, and resilient means disposed between the conical surface and flange and tending to separate the said conical surface and flange, whereby to produce a pressure upon the flange and adjacent washer in a direction to urge the sealing surface of the washer against the sealing surface of the said one structure.

4. A seal for relatively rotatable structures, one of said structures having a radially disposed sealing surface, said seal comprising a washer having a sealing surface thereon adapted to cooperate with the first-mentioned surface to form a fluid-tight seal therebetween, a rigid sleeve having at one end a slidable driving connection with the washer, a shoulder near the other end, an enlarged portion connected to the shoulder, a flange extending radially outwardly from the enlarged portion and an axially extending flange at the end of the radial flange, said axial flange overlying the enlarged portion to form an annular recess; means for effecting a seal between the sleeve and the other of said structures, a sealing element surrounding the sleeve, one end of said sealing element being compressed in said recess, the other end being radially disposed and abutting the washer and the intermediate portion being in the form of a radially inwardly disposed fold; and resilient means acting between the ends of the sealing element to maintain a seal between the sealing element and washer and to maintain the sealing washer in contact with the radially disposed sealing surface on the said one relatively rotatable structure.

ALBERT J. MATTER.

REFERENCES CITED

The following references are of record in the file of this patent:

UNITED STATES PATENTS

| Number | Name | Date |
| --- | --- | --- |
| 2,224,449 | Schmied | Dec. 10, 1940 |
| 2,264,983 | Karlberg | Dec. 2, 1941 |
| 2,347,118 | Matter | Apr. 18, 1944 |

FOREIGN PATENTS

| Number | Country | Date |
| --- | --- | --- |
| 111,898 | Australia | 1940 |